US009438653B2

(12) United States Patent
De Vleeschauwer et al.

(10) Patent No.: US 9,438,653 B2
(45) Date of Patent: Sep. 6, 2016

(54) METHOD FOR PROVIDING AN ADAPTIVE STREAMING SERVICE (75) Inventors: Bart De Vleeschauwer, Dendermonde (BE); Rafael Huysegems, Walem (Mechelen) (BE)

(73) Assignee: Alcatel Lucent, Boulogne-Billancourt (FR)

(*) Notice: Subject to any disclaimer, the term of this patent is extended or adjusted under 35 U.S.C. 154(b) by 286 days.

(21) Appl. No.: 13/977,814

(22) PCT Filed: Dec. 21, 2011

(86) PCT No.: PCT/EP2011/073674
§ 371 (c)(1),
(2), (4) Date: Jul. 1, 2013

(87) PCT Pub. No.: WO2012/093034
PCT Pub. Date: Jul. 12, 2012

(65) Prior Publication Data
US 2013/0282918 A1 Oct. 24, 2013

(30) Foreign Application Priority Data
Jan. 4, 2011 (EP) .................................... 11305008

(51) Int. Cl.
G06F 15/16 (2006.01)
H04L 29/06 (2006.01)
(Continued)

(52) U.S. Cl.
CPC ........... H04L 65/60 (2013.01); H04L 65/4084 (2013.01); H04L 67/02 (2013.01); H04L 69/28 (2013.01); H04N 21/8455 (2013.01)

(58) Field of Classification Search
None
See application file for complete search history.

(56) References Cited

U.S. PATENT DOCUMENTS 8,098,973 B2 1/2012 Kelly et al.
8,681,854 B2 3/2014 Leprovost et al.
(Continued)

FOREIGN PATENT DOCUMENTS

CN 1606356 A 4/2005
CN 101505316 A 8/2009
(Continued)

OTHER PUBLICATIONS

From IDS: "Using HTTP Pipelining to Improve Progressive Download over Multiple Heterogeneous Interfaces" by Dominik Kaspar et al; Simula Research Lab, Norway; U of Oslo, Norway; Telenor R&I, Norway; Published by Communications (ICC), 2010 IEEE International Conference ON; IEEE, Piscataway, NJ, US; ISBN 978-1-4244-6402-9.*

(Continued)

Primary Examiner — Arvin Eskandarnia
(74) Attorney, Agent, or Firm — Fay Sharpe LLP (57) ABSTRACT A method for providing a streaming service from a server to a client, comprises the steps of requesting respective consecutive segments (S1Q1, S2Q2, S3Q3) by said client from said server, each consecutive segment being requested with an associated requested quality (Q1, Q2, Q3), at respective timing instances being determined by said client based on a timing parameter (PipelineEmptyEstimate), determined by said client, of the channel occupancy between said client and said server, such that a next request for a next segment can be transmitted by said client to said server, before complete receipt of the previous segment by said client. A client adapted to perform this method is disclosed as well.

12 Claims, 10 Drawing Sheets (51) Int. Cl.
*H04N 21/845* (2011.01)
*H04L 29/08* (2006.01)

(56) References Cited

U.S. PATENT DOCUMENTS

| | | | |
|---|---|---|---|
| 8,904,426 B2 | 12/2014 | Krause et al. | |
| 2011/0231569 A1 | 9/2011 | Luby et al. | |
| 2013/0086279 A1* | 4/2013 | Archer | H04L 69/14 709/233 |
| 2013/0091249 A1* | 4/2013 | McHugh | H04N 21/23439 709/219 |
| 2013/0097309 A1* | 4/2013 | Ma | H04L 29/08099 709/224 |
| 2014/0219082 A1* | 8/2014 | Geijer Lundin | 370/229 |
| 2015/0163273 A1* | 6/2015 | Radcliffe | H04L 65/602 709/231 |

FOREIGN PATENT DOCUMENTS

| | | |
|---|---|---|
| CN | 101606389 A | 12/2009 |
| CN | 101621663 A | 1/2010 |
| CN | 102550034 A | 7/2012 |
| WO | WO 2008/085935 A1 | 7/2008 |

OTHER PUBLICATIONS

Dominik Kaspar et al., "Using HTTP Pipelining to Improve Progressive Download over Multiple Heterogeneous Interfaces," IEEE Communications Society, XP031703452, 5 pages, May 23, 2010.
Kristian Evensen et al., "Quality-Adaptive Scheduling for Live Streaming over Multiple Access Networks," XP002637141, pp. 21-26, Jun. 2, 2010.
Thomas Schierl et al., "Response to CIP on HTTP Streaming of MPEG Media—On Adaptive HTTP Streaming using SVC and MVC," International Organisation for Standardisation, XP030046441, 13 pages, Jul. 22, 2010.
N. Zong Huawei Technologies, "Survey and Gap Analysis for HTTP Streaming Standards and Implementations," Internet Engineering Task Force, pp. 1-23, Oct. 16, 2010.
International Search Report for PCT/EP2011/073674 dated Jan. 16, 2012.
K. Evensen, et al., "Quality-Adaptive Scheduling for Live Streaming over Multiple Access Networks," NOSSDAV' 10, Jun. 204, 2010, Amsterdam, The Netherlands, 6 pages.
D. Kaspar, et al., "Using HTTP Pipelining to Improve Progressive Download over Multiple Heterogeneous Interfaces," Communications (ICC), 2010 IEEE International Conference on May 23, 2010, 5 pages.

* cited by examiner

METHOD FOR PROVIDING AN ADAPTIVE STREAMING SERVICE

The present invention relates to a method of providing a streaming service from a server to a client.

Adaptive streaming is a solution by which video or other content is divided into fragments or segments, and where different resolutions or quality levels for each video fragment or segment are made available by a server e.g. N resolutions are available for each video segment. A client continuously monitors the amount of bandwidth available, and will e.g. http request/download that fragment representing a particular quality and/or resolution of the video for which there is sufficient bandwidth available on the connection between the client and the server. By requesting fragments one after the other at possibly different resolutions, this can result in a smooth video experience even though the bandwidth varies.

In http adaptive streaming a HTTP GET request will typically only be issued for the next segment, once the complete previous segment was received.

A problem with this approach is that for each segment a period that has the duration of a round trip time is wasted. This has an effect on the total bandwidth between server and client that will be used when using this technology. Especially for large delay networks this will have a clear consequence on the total bandwidth that can be achieved. The negative effect of large round trip times increases for small segments and networks with a high bandwidth-delay product, as in this case the total time of the request-response may be dominated by the round trip time and not by the intrinsic bandwidth limitation itself. And in case an HTTP adaptive streaming solution is used for the delivery of SVC encoded video segments, this effect will be more pronounced since an AVC encoded segment can be equivalent to one base layer segment and one or more enhancement layer segments in SVC.

It is therefore an object of embodiments of the present invention to provide a solution which solves the aforementioned problems.

According to embodiments of the present invention this object is achieved by means of a method for providing a streaming service from a server to a client, said method comprising the steps of requesting respective consecutive segments by said client from said server, each consecutive segment being requested with an associated requested quality, at respective timing instances determined by said client based on a timing parameter determined by said client, related to the channel occupancy between said client and said server, such that a next request for a next segment can be transmitted by said client to said server, before complete receipt of the previous segment by said client.

By making the instances of requesting the next segments dependable on a timing parameter related to the channel occupancy between the client and the server, a pipelined approach offering a smoother delivery at less wasted bandwidth is obtained.

The instances of requesting the next segments may be further dependent upon the filling or occupancy level of a client receipt buffer. In a variant embodiment this can also be the case for the determined quality.

The timing parameter can be determined based on information provided by the server. Alternatively the timing parameter can be determined based on at least one measured parameter of the communication channel between the client and the server.

In another embodiment the requested quality can also be determined based on this at least one measured parameter of the communication channel between server and client.

This at least one measured parameter can be a round trip time, as well as a bandwidth related parameter. The latter may be obtained by dividing the size of the received segment by the difference in time between receipt of the last byte of his segment and the issuance of the request for this previous segment in accordance with existing methods. Alternatively this bandwidth related parameter may also be calculated by dividing the size of the previously received segment by the difference in receipt time between the first byte and the last byte of the previously received segment.

The present invention also relates to embodiments of a client, adapted to realize the aforementioned embodiments of the method.

Further variants are set out in the appended claims.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

The above and other objects and features of the invention will become more apparent and the invention itself will be best understood by referring to the following description of an embodiment taken in conjunction with the accompanying drawings wherein:

FIGS. 2a-b show schematic timing diagrams resulting from two embodiments of the present method, FIG. 3 further illustrates the timing events of FIG. 2a in both client and server, FIGS. 4a-b provide schematic flowcharts for determining timing instances for generating the consecutive requests for consecutive video fragments, FIG. 5 provides an embodiment of the flowchart of FIG. 4a for being implemented for requesting segments of AVC encoded video, FIG. 6 provides another embodiment of the flowchart of FIG. 4a, for being used for requesting segments of SVC encoded video, FIGS. 7a-b-c show a comparison of traditional http adaptive streaming (FIG. 7a) and two http adaptive streaming embodiments (FIGS. 7b-c) of our method, FIG. 8 schematically shows an embodiment of a client adapted to realize embodiments of the method.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Figure 1:
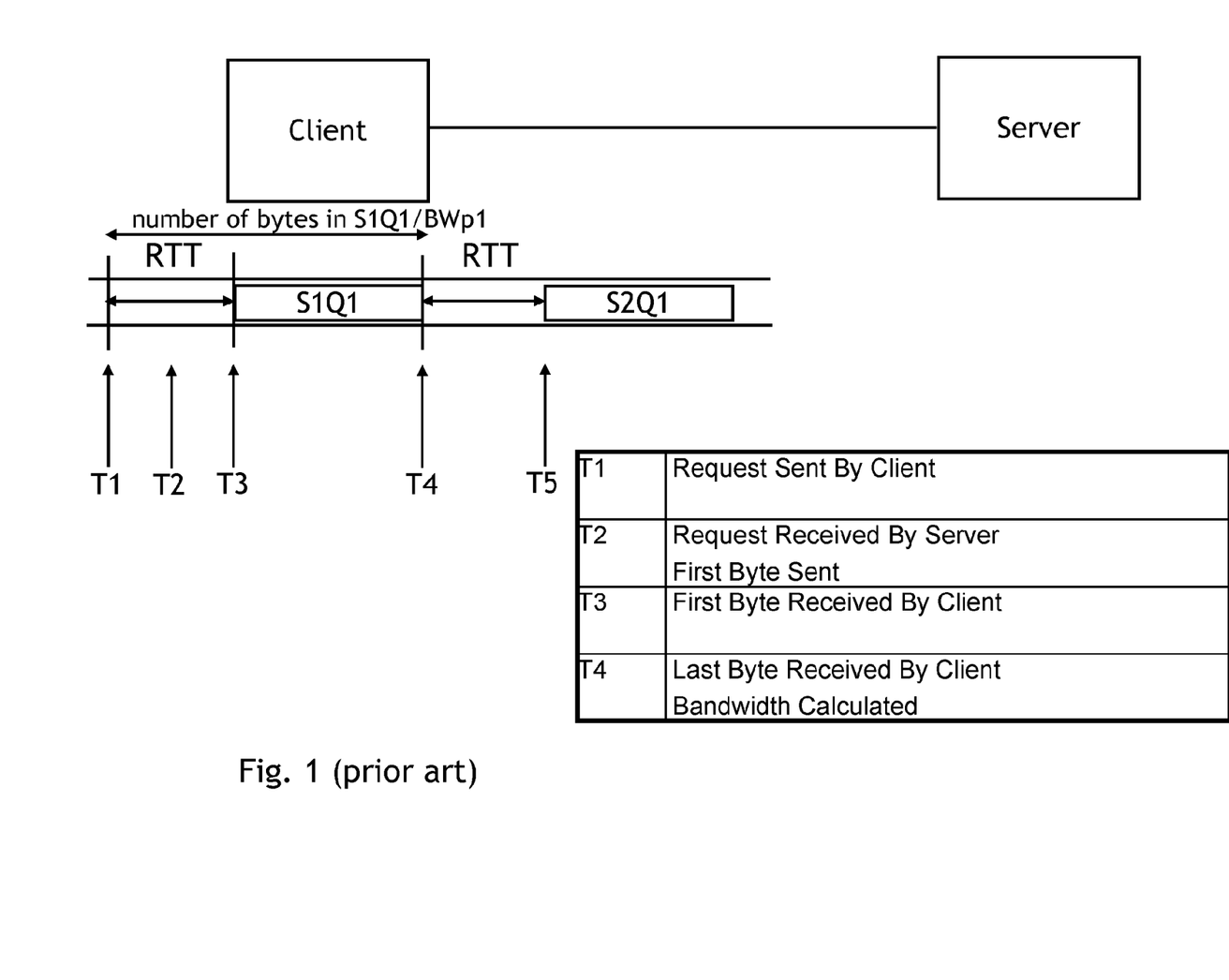
FIG. 1 shows a schematic timing diagram of a prior art adaptive streaming method.

Present techniques for adaptive streaming, such as HTTP adaptive streaming, are using an approach where e.g. video or audio is encoded into several qualities and segmented into individual chunks. The duration of a video segment is typically in the order of a few seconds. These segments are downloaded by a client, from a server, by requesting them sequentially, thus one after another. This means that only when a segment is completely received by the client, this client will issue a HTTP GET request for the next segment. This is schematically shown in FIG. 1 where at time T1 a first request, typically a HTTP GET request, is sent from the client to the Server. At T2, this request is received by the server, upon which receipt the server starts transmitting the first byte of this first segment S1Q1 to the client. This first byte is received at the client at time T3. The time difference between the first request being sent by the client, and the receipt of the first byte of this segment S1Q1 by the client, being thus T3−T1, is typically called the round-trip time and is abbreviated by RTT. At time T4, the last byte of this segment S1Q1 is received, and the client then immediately issues a next GET request, for the next segment. This next segment S2Q1 is then received at the client at a time T5, being equal to T4+RTT, the round trip time RTT.

The used bandwidth BWp1 that is thus obtained, may, according to prior art techniques be determined based on the measured/observed size of this segment, expressed in the number of bytes of S1Q1, divided by the time difference T4−T1 in FIG. 1. In practice, this determined value for the first segment, can be temporarily stored and updated upon reception of a new packet, e.g. via an exponentially weighted smoothing average technique. This measured bandwidth related parameter, denoted BWp1 in FIG. 1, is used in the prior art method to determine the quality of the next requested segment A problem with this approach is that for each segment a period with a duration of a round trip time RTT is wasted. This has an effect on the total bandwidth between server and client that will be used when using the Http Adaptive Streaming technology. Especially for large delay networks as can be experienced in some mobile technologies, this will have a clear consequence on the total bandwidth that can be achieved. The negative effect of large round trip times increases for small segments and networks with a high bandwidth-delay product, as in this case the total time of the request-response may be dominated by the round trip time. Also in case an HTTP adaptive streaming solution is used for the delivery of Scalable Video Coding, abbreviated by SVC, segments, this effect will be more pronounced, since an AVC coded segment is equivalent to one base layer segment and one or more enhancement layer segments in SVC coding. Thus in case several enhancement layers are required per segment, several delays of a RTT duration may be lost for just one segment.

Figure 2A:
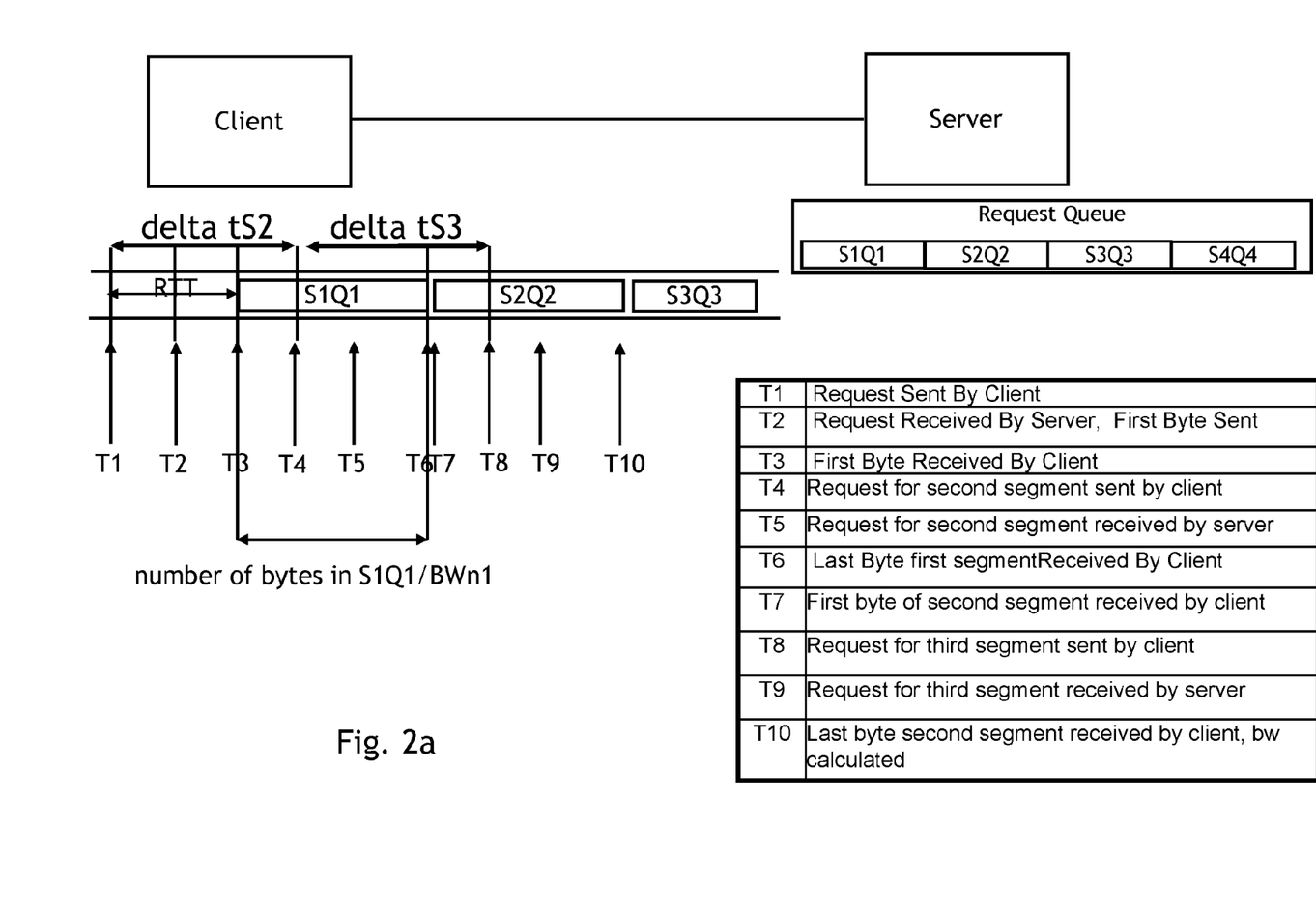
Figure 2B:
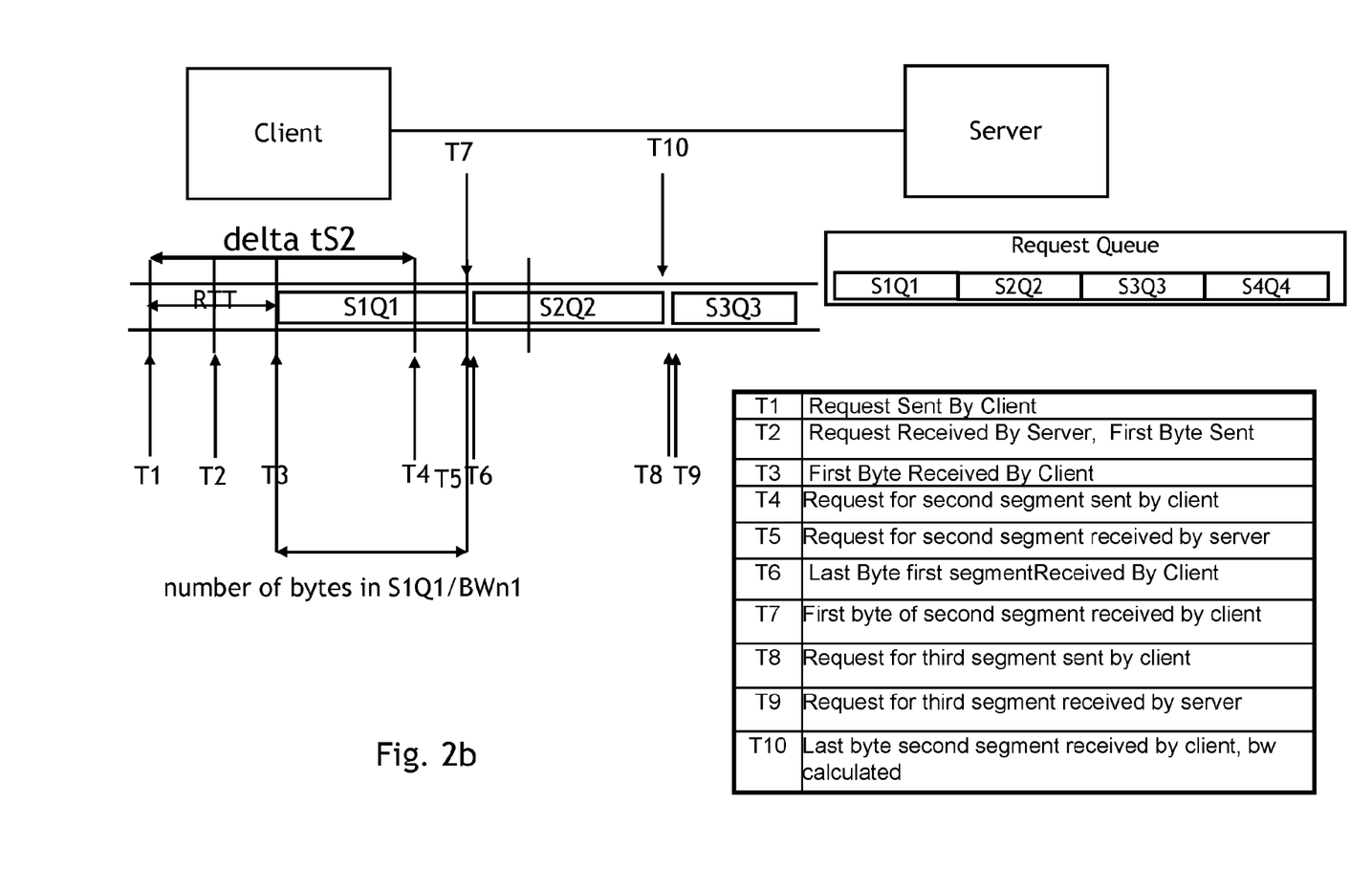

In order to reduce this delay, a method for pipelining the requests is therefore proposed. This means that in general a request for a next segment SiQi will no longer be only transmitted from the client to the server, upon receipt of the last byte of the previous segment Si-1Qi-1, but possibly earlier. In FIG. 2 this is indicated by the request for the second segment being issued at T4, which is at a distance of delta tS2 from T1, being the time of requesting the previous segment S1Q1. Similarly, in FIG. 2, the request for the third segment is issued by the client at T8, which is at a delta tS2 from T4, the time of requesting the second segment. In some cases, not shown on FIG. 2, it is even possible that a next request is transmitted from the client, even before receipt of any bytes of the previous segment. The transmission of the requests for respective segments can thus be made irrespective of the fact of whether the previous segment was received or not. The determination of the instances of these requests is now based on the determination, by said client, of a timing parameter, which timing parameter is related to the occupancy of the channel between client and server. Methods for determining such a timing parameter will be explained in further parts of this document.

By requesting the next segments before completely having received the previous segments, an improved segment based delivery will be realized, which is especially useful in environments with large delays. The client is therefore adapted to calculate the time for issuing a next request for a next consecutive segment, based on this timing parameter, and may also be adapted to determine the quality of these requested segments on the basis of at least one measured parameter, such as the round trip time and/or a bandwidth related parameter of the communication channel between said client and said server. The timing instances of the respective requests are thus determined by the client based on this timing parameter, which is itself also determined by the client, and which is representative of the channel occupancy between client and server. A next request for a next segment can therefore be transmitted by said client to said server, before complete receipt of the previous segment by the client.

Optionally the timing instances can be further determined based on the occupancy level of a client receipt buffer to which said respective segments are provided by said server. In case of e.g. enough received segments in the client buffer, this can then result in a larger delay between consecutive requests, such that in these cases the requests can still be issued after complete receipt of the previous segments.

In a preferred embodiment the timing parameter is further determined based on the at least one measured parameter of the communication channel. However, other embodiments exist where this is not needed. For instance, in a system where the clocks between client and server are synchronized, the client could receive the information of when the server pipeline would be empty directly and could determine the time to send the request based on this. This procedure would involve the need of extra communication messages between client and server during which messages the client first polls the server for this information, which is answered by the server by a message indicating e.g. the expected the remaining time for delivery of the requested segments.

As previously mentioned, this at least one measured parameter of the communication channel can be the round trip time and/or a bandwidth related parameter. In some embodiments this bandwidth related parameter, to be used for the calculation of the timing parameter, can be obtained in a different way compared to the one used in prior art situations. One method of calculating this bandwidth related parameter may comprise dividing the size, generally expressed in bytes, of the previously received segment, by the difference in receipt time between the last byte and the first byte of this previously received segment. This difference in time is T6−T3 in FIG. 2a. This bandwidth related parameter is indicated by BWn1 in FIG. 2a. This is thus different from the traditional method of determining the bandwidth BWn1 as shown and explained with reference to FIG. 1.

In some embodiments the associated requested quality may also be determined based on the at least one measured channel parameter and/or based on the occupancy level of said client receipt buffer, but both variants are optional.

Figure 8:
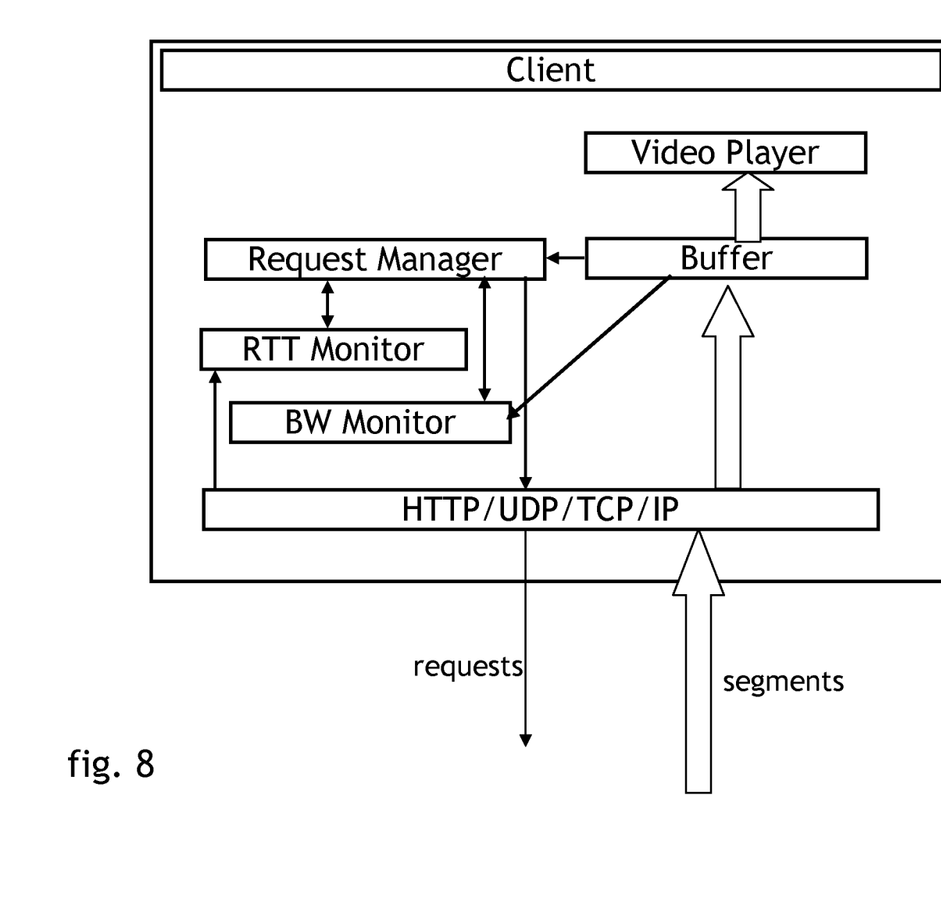

In order to determine this bandwidth related parameter, the client contains a monitor module for monitoring the timing and size of incoming segments, and to calculate therefrom the bandwidth related parameter in one of the aforementioned, or even in a still different way. In FIG. 8, such a module is denoted by BW Monitor. For the measurement of the round trip time, a specific module can be included, which is adapted to generate a test signal to the server, which is, upon receipt by the server, immediately transmitted back to the client. These techniques are known to a person skilled in the art and therefore do not need to be further detailed here. In FIG. 8 this module is denoted RTT Monitor.

However other implementations of a client are possible wherein not such a clear delineation between the different modules is present, and wherein e.g. a central client processor is adapted to perform all these steps.

The server itself can be a traditional server meaning that it has support for the pipelining of requests, a technique that is described in HTTP 1.1 in RFC 2616.

Using the aforementioned pipelining techniques according to embodiments of the present method, the request for the next segment may thus be transmitted from the client to the server even before a number of older requests that were already transmitted to the server, were handled or processed by the server. For these embodiments of the method, for which the bandwidth related parameter is as in FIG. 2a, the round trip time will have no further influence.

Figure 3:
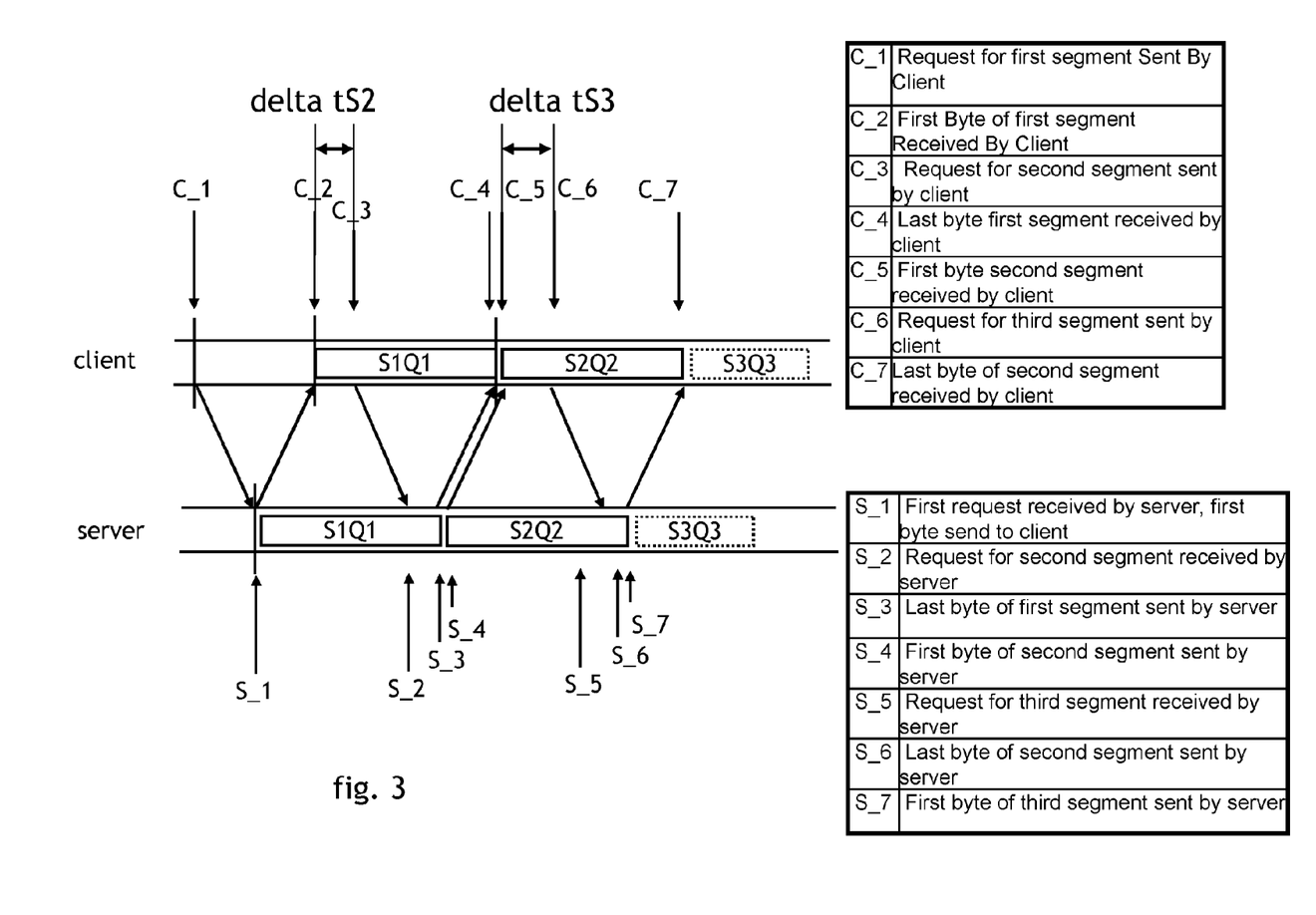

The impact of pipelining the requests and the associated advantages are illustrated in FIGS. 2a-b and 3. These figures are self-explanatory, both figures indicate that the time for generating a next request is at a respective calculated delay, denoted by delta ti for respective requested segment SiQi, with respect to receipt of the first bytes of the previous segment Si-1Qi-1. However in other embodiments only the respective time instances are calculated as such. The server is such as to process one segment after the other, as shown in FIGS. 2a-b by the queuing of the segments one after the other, and handling the request queue such that the first received request is first handled according to FIFO principles. FIG. 3 indicates that upon receipt, within the server, of a request e.g. for the first segment, the first byte of this segments will be sent by the server to the client, in a sequential way, thus as soon as the last byte of the previous segment was transmitted to the client. The first segment will be transmitted by the server almost immediately upon receipt of the request for this first segment, at time S1. Next segments will however be sent by the server, upon receipt of their request, and as soon as the channel between client and server is empty again. This is schematically denoted in FIGS. 2a and 3 by the client and server receiving, resp. transmitting the successive segments in a pipelined way. Segment S2Q2 will thus be transmitted from time S_4 on, which comes some time after the receipt of the request for this segment by the server, which receipt occurs at time S_2 etc. In the embodiment denoted in FIG. 3 this involves some pipelining capabilities of the server, a technique which is described in http1.1 in RFC2616. The server is thereby adapted to sequentially transmit the bytes of the requested segments on this channel using a pipelined optimum use, thus one after the other. Using the TCP/IP protocol in conjunction with this mechanism implies a check of the bandwidth and potential congestion of the channel to the client.

In some embodiments, it is however possible, by a careful calculation by the client of the time instances for generating and transmitting the request, and being immediately processed by the server by immediately transmitting the requested segments on the channel, that a pipelined approach will be obtained, even without this functionality being present at the server. This is shown in FIG. 2b which shows that, by a careful transmission of the requests such that these arrive at the server when the last byte of the previous segments was sent towards the client, a pipelined approach results even without the server having these pipelining capabilities.

By thus carefully calculating these instances in time for generating and transmitting the request by the client such as to anticipate a smooth delivery, one after the other, by the server, a very efficient use of the channel will thus be obtained.

Figure 4A:
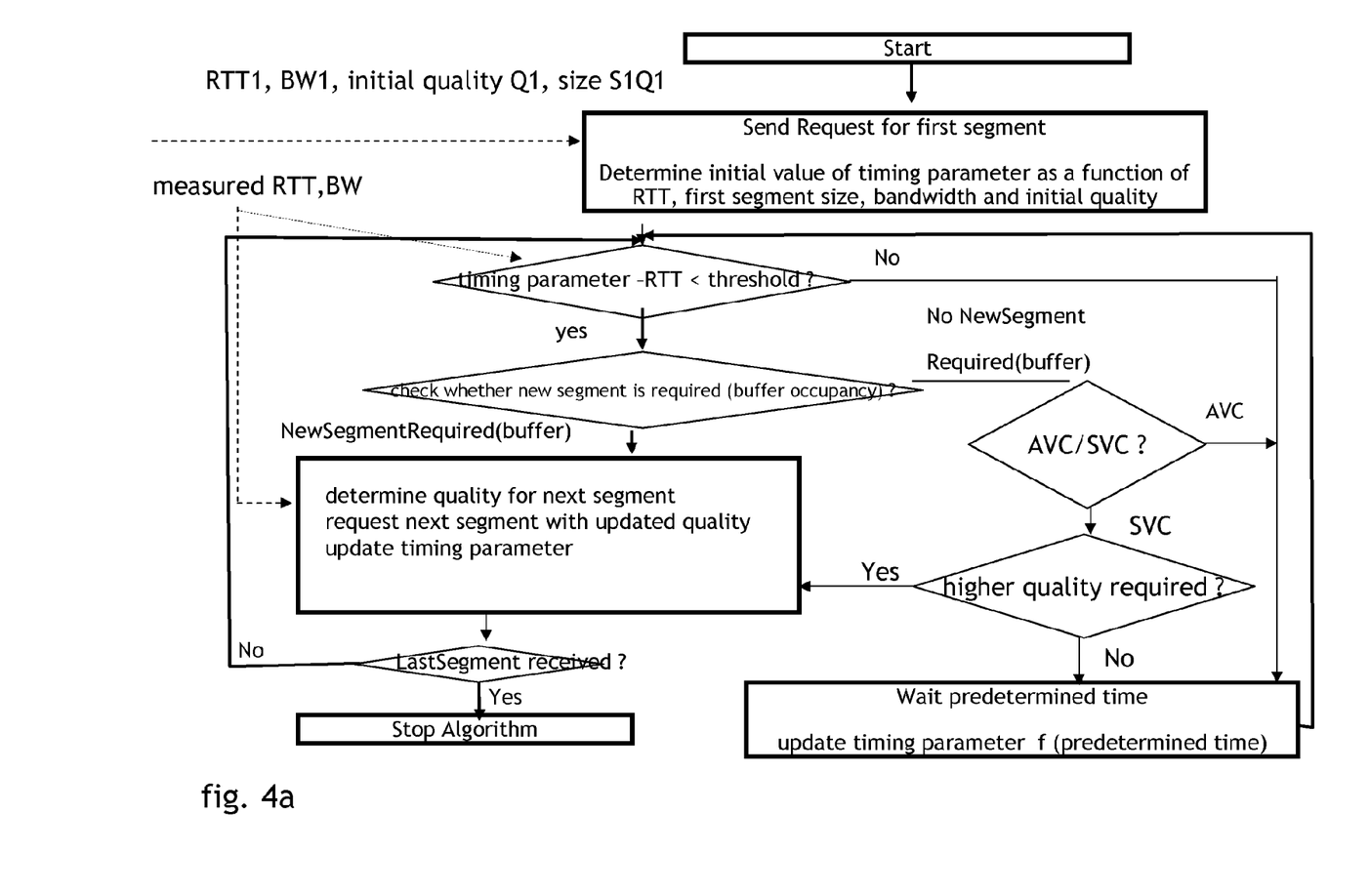

A method for calculating these instances in time, for requesting encoded video segments with an associated determined quality, is shown in FIG. 4a.

This embodiment starts with sending a request for the first segment S1Q1 with an initial determined quality Q1, which can be an initial default quality Q1, stored in a memory upon being input by a user, or as a default parameter. Alternatively the quality can be determined based on information on the availability of bandwidth in general, on the bandwidth available in previous sessions or based on other types of measurements.

In general, for this initial quality, the monitoring modules of the client are thus not able to take into account previous measurements, and thus a number of segments with the lowest quality may be requested.

In FIG. 4a, after having transmitted the request for the first segment, an initial value of the timing parameter related to the channel occupancy between client and server is determined. This timing parameter is denoted "pipelineEmptyEstimate" in FIGS. 5 and 6, and its initial value is calculated as the initial estimated value of the round trip time RTT1 added to the quotient of the requested or estimated size of the first requested segment S1Q1 and the initial bandwidth related parameter BW1. However in other embodiments this timing parameter can be calculated in a different way, e.g. by using the average segment size instead of the actual size, if the latter information would not be available to calculate pipelineemptyestimate. Another variant could be realized via a client-server communication, where the information of an estimation of what is in the pipeline and when the pipeline would be empty could be communicated by the server to the client, in case the server supports this capability. In that variant the timing parameter could just be communicated by the server to the client.

In a next step in FIG. 4a, the difference between the value of the timing parameter and the actual measured value of the round trip time RTT is compared to a predetermined threshold. This threshold is typically in the order of a few milliseconds or of tens of milliseconds. This threshold value will determine how fast a next segment will be requested In case this difference is thus smaller than the predetermined threshold, which may be indicative that the channel is empty, the segment receiving buffer in the client will be checked. More in particular, if this buffer is e.g. empty or lower than a predetermined filling level, e.g. 50%, this is indicative that a new segment is to be requested. If, on the contrary, this buffer is still filled above 50%, no new segment is needed. In other client receiver buffers this filling level is not expressed as a percentage of a maximum value, but is expressed in a number of seconds of video. In this case a threshold of 20 seconds can e.g. be used for determining whether or not a new segment is required, in view of the filling level of this buffer. However, this is all related to the size of the buffer, and thus may vary from client to client.

If the filling level of the buffer is such that no new segment is needed, e.g. indicating there are still sufficient segments for guaranteeing a stable playout, for AVC encoded video or other encoded contents, an arbitrary predetermined waiting time of, e.g. 1 ms, also generally related to the buffer dimensions, is introduced. The timing parameter is further updated as a function of this predetermined waiting time. This is in the embodiment of FIG. 5 done by subtracting the predetermined waiting time from the present value of the timing parameter in order to quickly go through the next buffer check cycles again, as can be seen from the flowcharts on these figures. However other waiting times and other updates of the timing parameter are possible. In FIG. 4a, in case the requested video was encoded using SVC, an extra check is performed whether a higher quality segment, to be provided in an extra layer according to the SVC standard, is needed. If not, again the same waiting time is introduced as in the case of AVC encoded video.

If it turned out that a next segment was required, as from the check of the client buffer occupancy, the quality for this next segment is determined. This may be done by present methods used in standard http adaptive streaming, which are based upon the measured round trip time and buffer level filling. Round trip time is typically taken into account implicitly and the system uses a bandwidth estimation and the buffer filling to calculate the next segment quality. An example system could e.g. be based upon a number of thresholds in the buffer. For instance, if less than 5 seconds are present in the buffer the system would always request the lowest quality and would not wait for sending the request. If the buffer contains between 5 and 15 seconds, the buffer could request the quality corresponding to a bandwidth that is lower than the measured bandwidth but it only differs at most one quality level from the quality of the previously requested segment. If the buffer contains between 15 and 20 seconds of video buffer, the client would request the quality corresponding to a bandwidth that is lower than the measured bandwidth.

An alternative algorithm would be one where the client just tries to download as many segments as possible according to the available bandwidth. In this case, the client could follow the strategy where downloading one segment would be followed by downloading the next segment at a quality level that corresponds to the bandwidth at which the previous segment was downloaded.

In both examples there is a direct relationship between the measured bandwidth and the quality. Using e.g. a look-up table containing this relationship can thus be used in an implementation for updating the requested quality.

A next segment is then requested with this updated quality. The timing parameter is updated as well, e.g. by adding the quotient of the size of the requested segment and the measured bandwidth, according to one of the newly proposed methods, to the present value of this timing variable, as set out in FIG. 5. This cycle is repeated, until the last segment is requested.

Figure 4B:
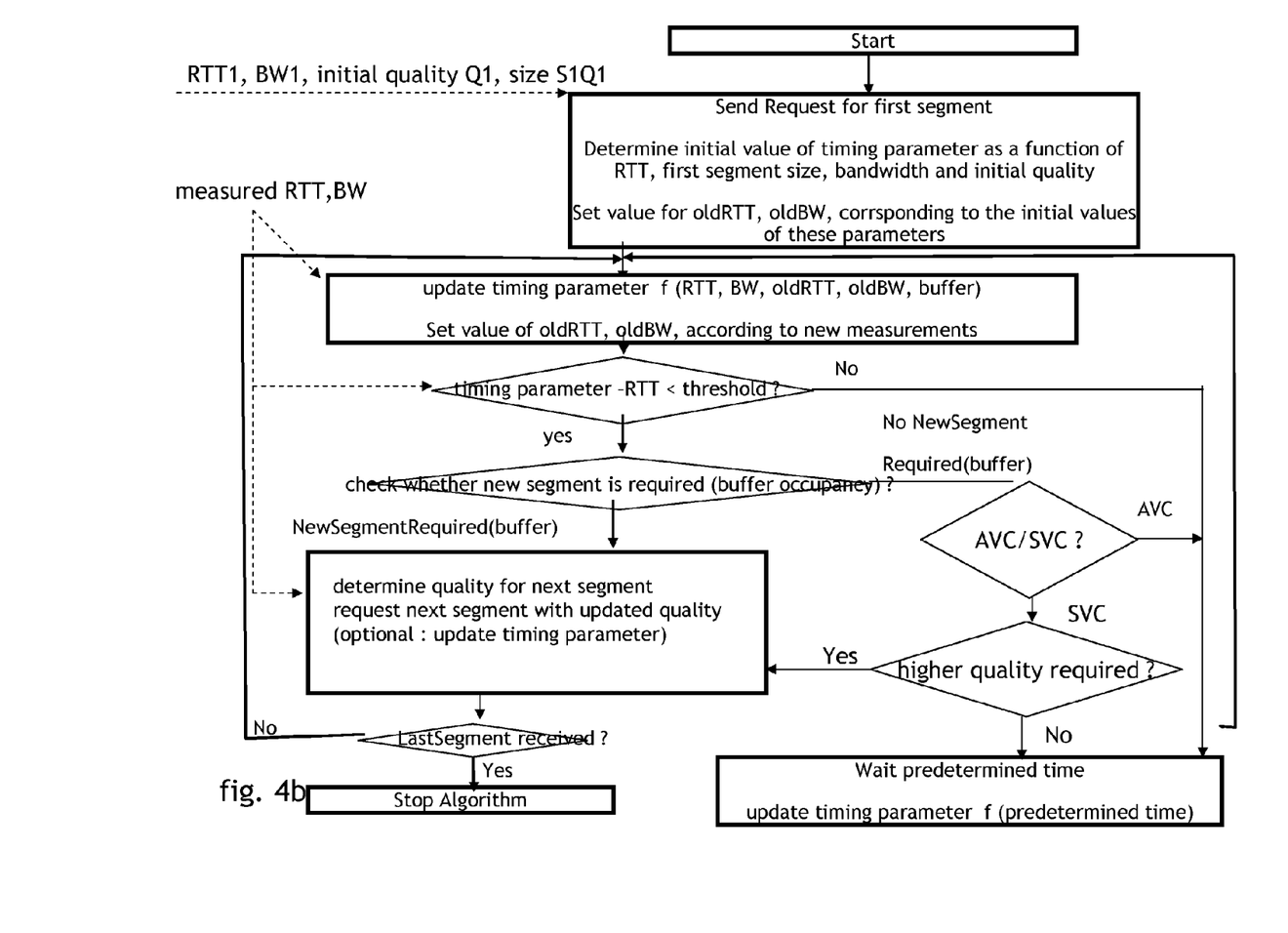

FIG. 4b shows an alternative method comprising an extra step of varying the timing parameter based on the measured parameters. The rationale here is that when the RTT and BW change over time, this will also impact the moment in time when the channel will be empty. An example of how this function could function is that when a new RTT is measured, RTT2, the timing parameter will be updated with the difference between the original RTT and the new RTT, RTT2. For the bandwidth, the client could keep track on the segments that were requested and where no bytes were received from. In this case, the segment size could be divided by the new BW and compared to the segment size divided by the old bandwidth. The timing parameter would then be updated with the difference in time between these two values. Optionally the timing parameter can as well be updated as was done in FIG. 4a, thus after having requested a next segment with an updated quality.

Figure 5:
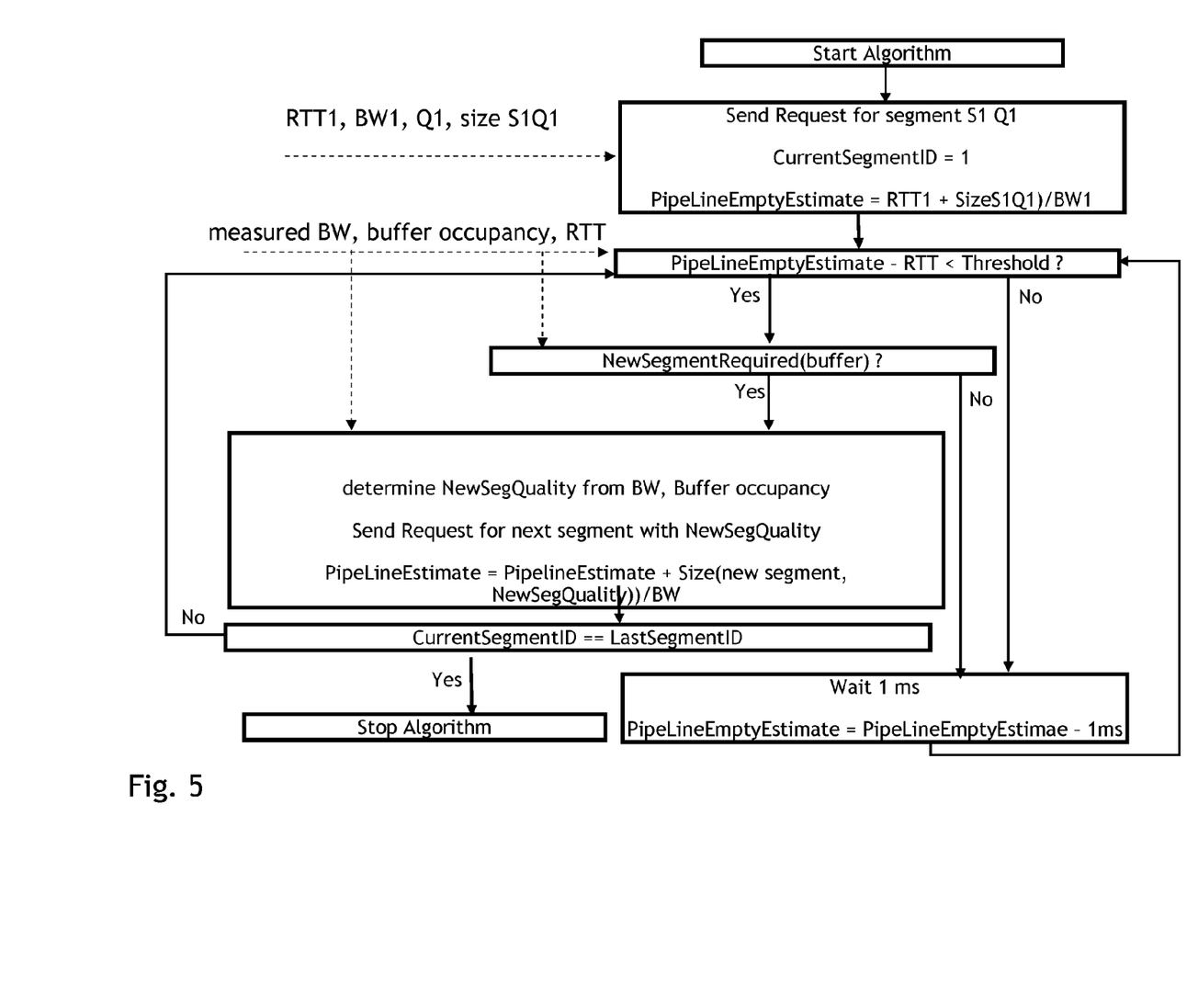

FIG. 5 shows a more detailed embodiment of an implementation of FIG. 4a which can be used for AVC encoded video.

Figure 6:
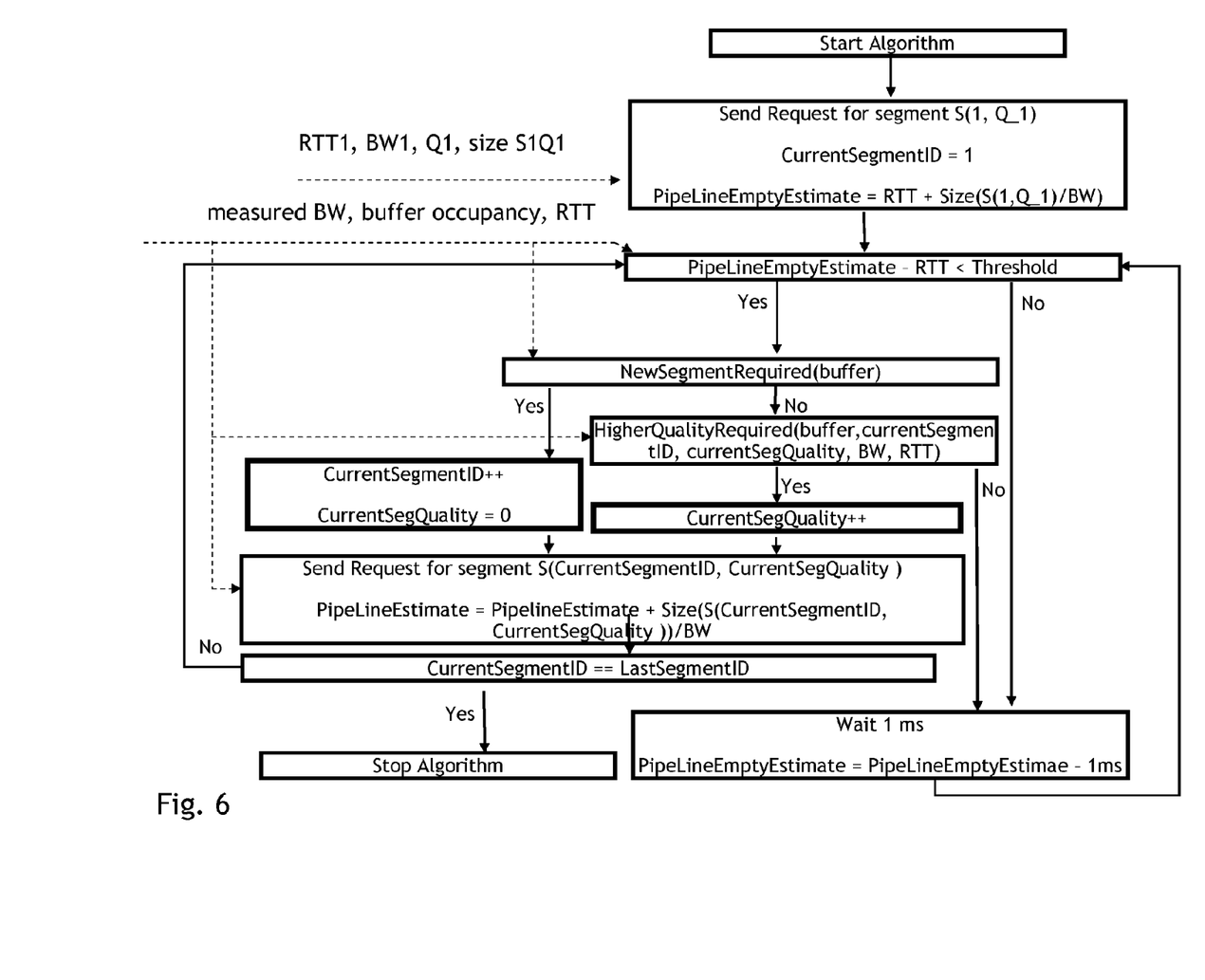

For the case of scalable video coding, abbreviated by SVC, encoded video, an embodiment of the method is set out in FIG. 6. The same steps as with the AVC encoded video are used, until the check whether or not a new segment is desired by the received buffer. If a new segment is desired, the segment identifier will then increase, and the first base layer, determining the base quality, will be put at zero. In case no new segment number is requested, it is checked whether some better quality layers, for e.g. a higher resolution, would be desirable. This is e.g. checked by using the BW and RTT estimates to determine when the next segment would be received and what the value of the buffer filling, in playout time would be at that point in time. For instance, if this value would be below a given threshold, e.g. 10 seconds, the client could decide not to request a new quality segment, depending on the application itself. The application could then decide not to take the risk of downloading this enhancement layer and to already start downloading a next temporal segment. This strategy could also be determined by other components. For instance on a terminal with a limited resolution such as a simple mobile phone, the algorithm could decide not to download a resolution higher than the screen resolution. On a resource constrained device, the algorithm could decide not to download a lot of higher layers, since these could introduce a need for extra CPU cycles. If, on the other hand, it turns out that indeed some better resolution or quality might be desirable for the present segment, the method will determine which layers to request. Different strategies could be followed here. A first one would be to request the next enhancement layer, possibly a temporal layer, a quality layer or a spatial layer, that builds further on the last layer the was requested/downloaded for the last temporal segment. Each layer can be contained in an individual file at the server side, or the server has the capability of generating a single file that corresponds to the requested layer. In SVC Http Adaptive Streaming, the quality layers that are available for a temporal segment build further on each other, instead of being independent. The advantage is that in this case a quality layer actually enhances the previously downloaded layers. For instance, to represent SiQ2, SiQ1 should be available. The advantage is that a client component should not decide to just download a large SiQ2, but would be able to gradually increase the quality, as long as bandwidth would be available In this case, the advantage of this technique will even be higher, since typically the SVC layers are smaller in size than individual AVC segments and the impact of delay will be larger for smaller sizes.

Figures 7A, 7B:
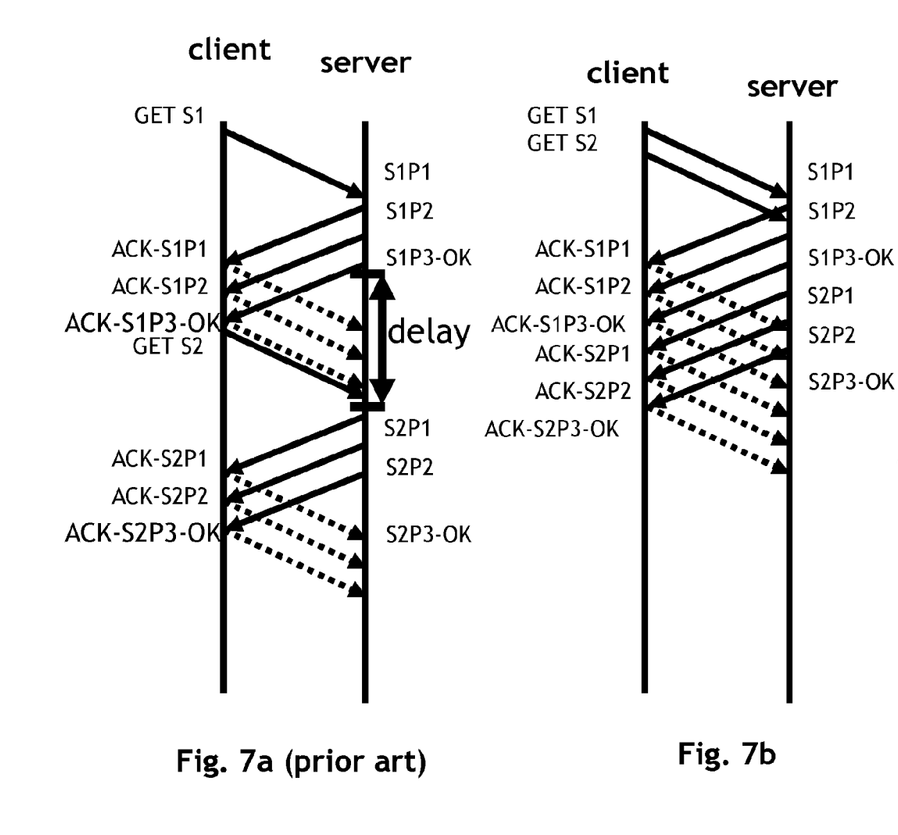
Figure 7C:
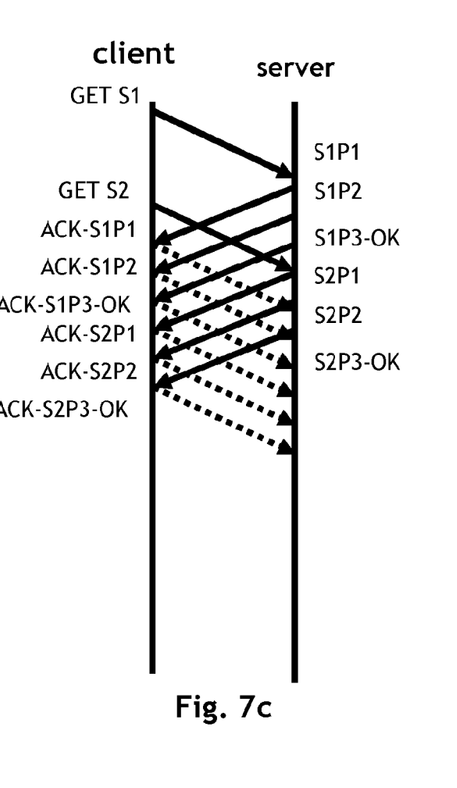

The effect of the pipelining using http/TCP protocol for the requesting and transmission of the segments and its comparison with a prior art http/TCP implementation is shown in FIGS. 7a-b-c.

The prior art http/TCP implementation is using http GET requests at the client for transmission to the server. In order not to overload the drawings the segments are only denoted by their sequence numbers, S1,S2,S3 but it is understood that when issuing the requests, the requested quality is indicated too.

Another difference with respect to the previous figures is that in these embodiments the segments are delivered as different parts. In the embodiments depicted in FIGS. 7a-c, each segment comprises 3 different parts. Thus segment S1 is delivered in three parts, denoted S1P1, S1P2 and S1P3. Similarly segment S2 is also delivered in three parts, denoted S2P1, S2P2 and S2P3.

In all prior art and new embodiments, the request for the first segment, being the message denoted by "GET S1" is transmitted from client to server. Some time later, upon receiving this request, the server responds by transmitting the first part of this, being S1P1. The client acknowledges receipt of this part by transmitting an ACK-S1P1 message back to the server, which indicates this first part was correctly received. After having transmitted the first part, the server continues with the transmission of the second part, S1P2; and receipt of this part by the client is as well acknowledged by the appropriate acknowledgement message. When the server has transmitted the last part, in this example being part S1P3, the server includes in the transmission message that this concerns the last part of the requested segment. In the FIGS. 7a-b-c, this is indicated by "S1 P3-OK" being transmitted from server to client. If also this part was well received by the client, the latter responds by a final acknowledgement message denoted "ACK-S1P3-OK" to the server.

In the prior art solution, a request for a next segment, denoted "GET S2" is then issued immediately after the acknowledgement message transmission by the client. Upon receipt of this new GET request, the procedure is repeated for this segment until the last part S2P3 is succesfully received and acknowledged by the client.

It can be observed from FIG. 7a that in the prior art solution a delay, as indicated in the figure, is present. This delay is no longer present in embodiments according to the invention, as shown in FIGS. 7b-c. FIG. 7b shows an embodiment where the requests are transmitted one after the other; in this case the server has some pipelining capabilities to sequentially handle these requests and transmit the requested segments in the requested order, without any delay. FIG. 7c shows an embodiment where the server does not need to have these pipelining capabilities, but where the client is adapted to generate and transmit the request at the appropriate instances in time such that these arrive at the server by the time when the server has transmitted the last part of the previous request.

In both embodiments it can be observed that the delay, as present in the prior art situation, has disappeared.

FIG. 8 schematically shows an embodiment of a client comprising a video player with a decoder, coupled to the receiver buffer. The latter is coupled to a data extraction/encapsulating module, denoted HTTP/UDP/TCP/IP which is acting as an interface with the physical channel on which the segments are received, and which extracts the useful data from the packets according to a particular protocol in which they are received. As is well known these protocols can be http over TCP/IP or UDP.

The client further comprises a monitoring module for monitoring the round trip time, denoted by RTT Monitor, which is coupled to the buffer as well as to the data extraction module, for these implementations wherein the round trip time is obtained by sending particular testing signals to the server and receiving them back. The client further comprises a module, denoted BW Monitor, coupled to the buffer and the request manager, and adapted to calculate the bandwidth in one of the aforementioned ways. The request manager is adapted to generate the requests, based on inputs from the RTT monitor, the bandwidth calculator, the receipt buffer. The thus generated requests are then provided to the data extraction/encapsulating module, which will encapsulate the requests into a request packet having the appropriate standardized format, as required by the selected protocol.

Of course a lot of alternative embodiments are possible. An embodiment where the request manager itself is adapted to receive the incoming segments, and to calculate therefrom the bandwidth and the RTT is feasible as well. Moreover embodiments exist where all functionality is performed by one single processor.

While the principles of the invention have been described above in connection with specific apparatus, it is to be clearly understood that this description is made only by way of example and not as a limitation on the scope of the invention, as defined in the appended claims.

The invention claimed is:

1. A method for providing a streaming service from a server to a client, said method comprising the steps of requesting respective consecutive segments by said client from said server, each consecutive segment being requested by said client with an associated requested quality, at respective timing instances, being determined by said client based on a timing parameter, related to the channel occupancy between said client and said server, such that a next request for a next segment can be transmitted by said client to said server, before complete receipt of the previous segment by said client, wherein said timing instances are further determined based on the occupancy level of a client receipt buffer to which said respective segments are provided by said server.

2. The method according to claim 1, wherein said timing parameter is further determined based on at least one measured parameter of the communication channel.

3. The method according to claim 2 wherein said at least one measured parameter is a round trip time and/or a bandwidth related parameter.

4. The method according to claim 3 wherein said bandwidth related parameter is obtained as the size of the previously received segment divided by the difference in time between receiving the last byte and the first byte of the previous segment.

5. The method according to claim 1 wherein said associated requested quality is further determined by said client based on said occupancy level of said client receipt buffer.

6. The method according to claim 1 wherein said associated requested quality is further determined by said client on the basis of said at least one measured parameter of the communication channel between said client and said server.

7. A client adapted to receive a streaming service of a server arrangement said client being adapted to request respective consecutive segments from said server, at respective instances in time, said client being further adapted to determine a timing parameter, related to the channel occupancy between said client and said server, and to determine the timing instances of the respective requests of said consecutive segments based on said timing parameter such that a next request for a next segment can be transmitted by said client to said server, before complete receipt of the previous segment by said client, said client being further adapted to determine said timing instances based on the occupancy level of a client receipt buffer within said client adapted to receive and temporarily store said respective segments from said server.

8. The client according to claim 7 being further adapted to determine said timing parameter based on at least one measured parameter of the communication channel.

9. The client according to claim 8 wherein said at least one measured parameter is a round trip time and/or a bandwidth related parameter.

10. The client according to claim 8 being further adapted to determine said bandwidth related parameter by measuring the size of the previously received segment and dividing this by the difference in time between receiving the last byte and the first byte of the previous segment.

11. The client according to claim 7 being further adapted to determine said associated requested quality based on said occupancy level of said client receipt buffer.

12. The client according to claim 7 being further adapted to determine said associated requested quality based on said at least one measured parameter of the communications channel.

* * * * *